US008793196B2

(12) United States Patent
Parkos et al.

(10) Patent No.: US 8,793,196 B2
(45) Date of Patent: Jul. 29, 2014

(54) SYSTEM AND METHOD FOR DELIVERING DIGITIZED MAIL

(75) Inventors: Arthur J. Parkos, Southbury, CT (US); Paul P. Carella, Southbury, CT (US); Ronald P. Sansone, Weston, CT (US); Chao Chen, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1236 days.

(21) Appl. No.: 11/648,416

(22) Filed: Dec. 29, 2006

(65) Prior Publication Data

US 2008/0158615 A1 Jul. 3, 2008

(51) Int. Cl.
*G06Q 10/00* (2012.01)
*G06Q 30/00* (2012.01)

(52) U.S. Cl.
USPC ............. 705/338; 705/1.1; 705/337; 705/341

(58) Field of Classification Search
USPC .......................................... 705/1.1, 330–341
See application file for complete search history.

(56) References Cited

U.S. PATENT DOCUMENTS 5,354,097 A 10/1994 Tel
5,778,066 A 7/1998 Shah et al.
5,805,747 A * 9/1998 Bradford ....................... 382/310
6,285,777 B2 * 9/2001 Kanevsky et al. ............ 382/101
6,311,214 B1 10/2001 Rhoads
6,370,526 B1 * 4/2002 Agrawal et al. .................... 707/5
6,459,953 B1 * 10/2002 Connelly et al. .............. 700/224
6,542,927 B2 4/2003 Rhoads
6,802,452 B2 * 10/2004 Lebaschi et al. .............. 235/476
2002/0042815 A1 4/2002 Salzfass et al.
2002/0165729 A1 * 11/2002 Kuebert et al. ................... 705/1
2003/0149737 A1 * 8/2003 Lambert et al. ............... 709/214
2004/0083119 A1 * 4/2004 Schunder et al. ................ 705/1
2004/0178128 A1 9/2004 O'Connell et al.
2005/0288932 A1 * 12/2005 Kurzweil et al. ............. 704/260
2006/0122858 A1 * 6/2006 Miles et al. ........................ 705/1
2006/0212304 A1 * 9/2006 Krause .............................. 705/1
2006/0215877 A1 9/2006 Biasi et al.
2006/0219601 A1 * 10/2006 Babanats et al. ............... 209/3.3
2007/0005517 A1 * 1/2007 True et al. ..................... 705/401
2008/0103791 A1 5/2008 Heiden et al.

* cited by examiner

*Primary Examiner* — George Chen

(74) *Attorney, Agent, or Firm* — Michael J. Cummings; Charles R. Malandra, Jr.; Steven J. Shapiro

(57) ABSTRACT

Systems and methods for optimizing the process of digitizing and delivering physical mail based upon selective scanning are described and in certain illustrative examples, an intelligent agent computer system is employed for making selective scanning decisions in the process of digitizing and delivering physical mail.

13 Claims, 3 Drawing Sheets

SYSTEM AND METHOD FOR DELIVERING DIGITIZED MAIL

CROSS-REFERENCE TO RELATED APPLICATION

This application is related to commonly-owned application Ser. No. 11/588,058, entitled "Intelligent Physical Mail Method and System," filed Oct. 26, 2006, by Heiden, et al. and which related application is incorporated herein by reference.

FIELD OF THE INVENTION

The illustrative embodiments described in the present application are useful in systems including those for optimizing the process of digitizing and delivering physical mail based upon selective scanning and more particularly are useful in systems including those for creating and utilizing an intelligent agent system for making selective scanning decisions in the process of digitizing and delivering physical mail.

BACKGROUND

Traditional mail extraction and scanning systems have been described including the Extraction and Scanning System described in U.S. Pat. No. 6,196,393 B1, issued Mar. 6, 2000 to Kruk, Jr., et al. and incorporated by reference herein. In the Kruk system, documents are sequentially opened and scanned before the next document is opened in order to maintain transactional integrity in a single record file. The process of opening and scanning each mail piece delivered to a company is expensive and time consuming.

Conventional mail scanning and delivery systems utilize a manually operated process requiring that each mail piece be scanned into an electronic image form. Thereafter, an operator decides how to route the document. The operator may manually select the addressee name viewed on the document from an email recipient name database and then initiate a new mail message attaching the electronic image of the mail piece. The operator does not receive real time disposition instructions from the intended recipient.

In digital mail processing systems, the processes of opening, extracting, imaging, indexing and digitally delivering mail contents consumes significant resources requiring personnel and system resources. Additionally, indexing and storage or other disposition of the received physical mail pieces consumes resources. Each mail piece put through the mail digitizing system consumes resources and if the number of mail pieces processed were reduced, the resources used would decrease. Accordingly, there is a need for a system that will conserve resources by processing only those mail pieces that require processing.

SUMMARY

The present application describes illustrative embodiments of systems and methods for optimizing the process of digitizing and delivering physical mail based upon selective scanning. In certain illustrative examples, an intelligent agent computer system is employed for making selective scanning mail piece disposition decisions in processing physical mail including in digitizing and delivering physical mail.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

Figure 1:
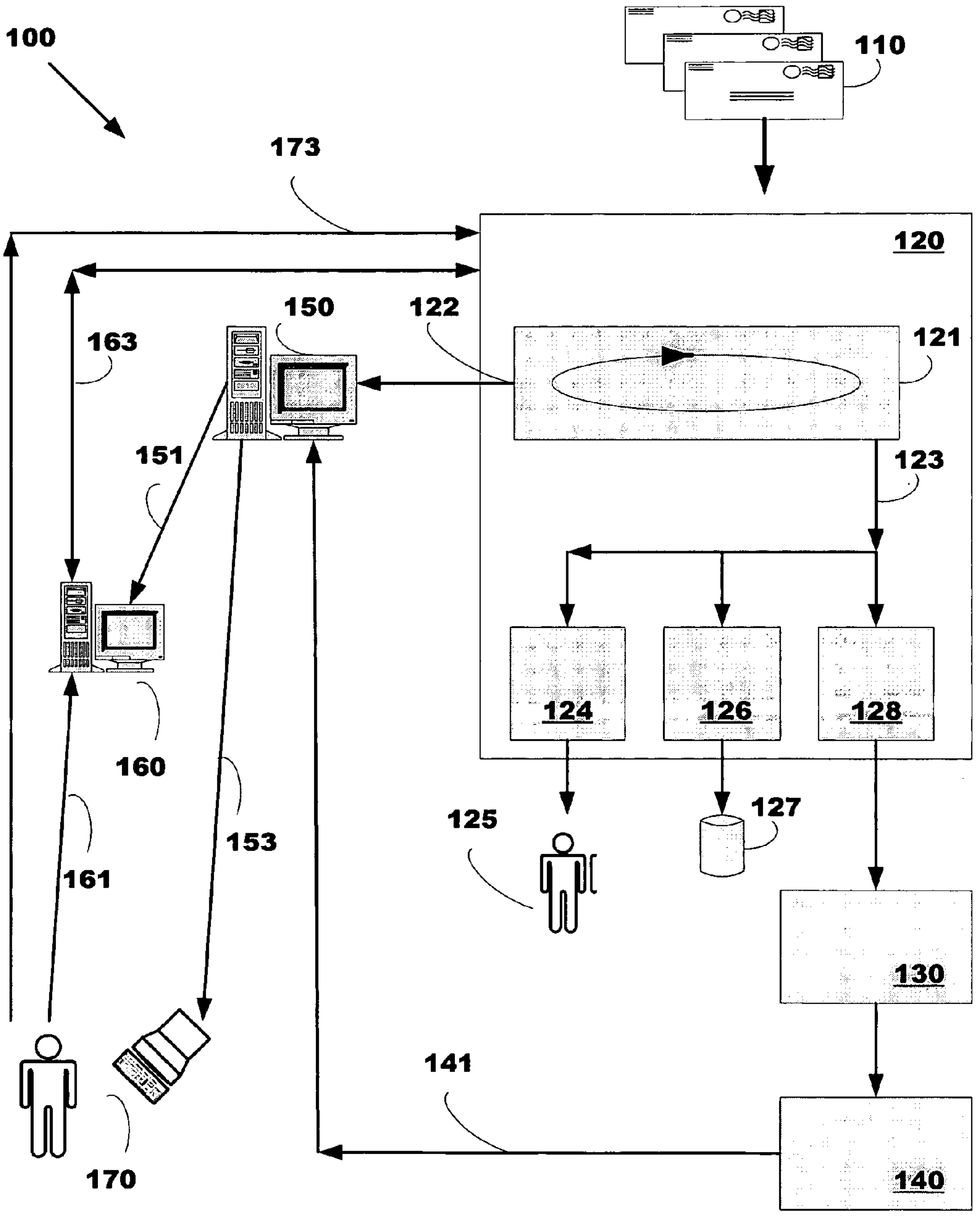
FIG. 1 is a schematic diagram of a system for delivering digitized mail according to an illustrative embodiment of the present application.

The illustrative embodiments of the present application describe systems and methods for providing a simultaneous voice and data user interface for secure catalog orders and in more detailed embodiments to provide a system and method for providing a distributed voice user interface for a remote device having a limited visual user interface simultaneously with a data stream for facilitating secure automated catalog orders for simultaneous electronic fulfillment applied to that device.

Systems for routing imaged documents are described in commonly-owned, co-pending application Ser. No. 10/249,038 entitled "System and Method for Routing Imaged Documents," filed Mar. 11, 2003 by O'Connell, et al., now U.S. Pat. No. 7,161,108, and are incorporated herein for use in any embodiment as suitable. Similarly, the systems of the commonly-owned co-pending application Ser. No. 11/588,058, "Intelligent Physical Mail Method and System" referred to and incorporated above may be utilized as suitable.

In the systems and methods described in the illustrative embodiments herein, digitized mail processing resources are conserved by processing only those mail pieces that the system determines that the recipient would like to receive. In one example, an intelligent agent computer system is used to monitor and determine recipient preferences and information related to mail pieces. The agent may utilize user preference data or make learned preference decisions regarding mail piece disposition. The learned preference data may be based upon the mail processing history for an individual or can take into account group data.

Observed behavior in company mailrooms has demonstrated that mail recipients will discard certain mail pieces without opening them and even before leaving the mail room. Those recipients presumably base their decision to discard such mail pieces on information gathered by merely examining the outer envelope or physical characteristics of the mail piece. Information such as the sender address, the method of postage payment and other markings and visual cues allow the recipient to determine the relative importance of the mail piece. In many cases, the recipient discards a particular mail piece after only a few seconds of examination. Additionally, some corporations have internal mail delivery policies in which certain types of mail are not delivered such as magazines.

As described above, the process of digitizing each piece of mail is costly. Accordingly, several illustrative embodiments are described herein that allow a reduction in the number of mail pieces completely processed through the system. In one example, an image of the envelope is obtained and sent electronically to the user. The system will request a mail piece disposition decision from the user based upon the image of the mail piece envelope. The disposition selections presented include discard, image and deliver, deliver hardcopy, forward electronic and/or hardcopy to another named recipient, group or department and any other special case dispositions as appropriate. Accordingly, the digitized mail system will only process those mail pieces that the recipient actually wants processed. The result is a reduction in the number of mail pieces completely processed by the digitized mail system by bypassing for certain mail pieces the costly processes of opening, extracting, imaging and routing the digitized mail pieces. In another illustrative example, a recipient or group of recipients may manually enter predispositions into the intelligent agent database for expected mail pieces. Once an expected mail piece arrives, the intelligent agent computer system controls the digitized mail system in accordance with the previously supplied instructions or rules for the expected mail piece.

In yet another illustrative example, the intelligent agent computer system performs supervised or directed learning of the delivery preferences for a recipient or group of recipients in order to make delivery disposition determinations. For example, with regard to an individual user, the system receives images of the envelope of a mail piece and determines and stores characteristic data regarding the mail piece such as whether postage payment was by stamp, postage meter indicium or by postage permit. Similarly, the system record the return information if any exists on the mail piece and any other category of marking such as a permitted envelope phrase or marking such as "Fragile" or "Do not Bend."

During initial incoming delivery sorting an identifier is assigned to the mail piece for tracking purposes. The image of the mail piece envelope containing all of its visual cues is forwarded to the recipient and the intelligent agent system monitors the manual disposition decision information from the recipient regarding the particular mail piece that is presumably based at least in part on those visual cues contained in the image of the mail piece. The intelligent agent computer system then associates the disposition action with the particular mail piece in a learning database. The intelligent agent then processes accumulated data over a group of mail pieces to determine if strong disposition trends can be associated with the mail piece characteristics determined from the envelope images. The system generates a user profile based on a statistical analysis of the manual disposition data and the visual cue data gathered. The system may be able to assign a particular level of confidence to an automated disposition decision based upon a particular set of mail piece envelope visual cues. Accordingly, the system may be instructed to make an automatic disposition decision if a certain confidence level threshold is reached or else to request manual disposition instructions. In this system, user feedback regarding automated disposition decisions may be received and used for improving the automated decision process.

Several steps are implemented in the process. A unique mail piece identifier is created and applied to the mail piece for identification and tracking purposes. For example, the identifier may be locally unique to a particular mail room or company and sufficiently unique in time given processing cycles so that overlap does not occur. An Olympus II incoming mail sorter available from Pitney Bowes Inc. of Stamford Conn. may be use for the sorting and identifier functions. An image of the mail piece envelope is captured by the Olympus II and the Intelligent Agent system receives that image. The Intelligent Agent system then extracts visual cue data and associates such data with the mail piece using the identifier. The Intelligent Agent uses OCR or other recognition technology to capture visual cues such as the recipient name, the particular form of the recipient name, the recipient address with any mail stop code and the sender name and address. The recognition system detects any logo on the envelope, the type of postage payment used and any mail delivery priority information. The mail sorter determines the intended recipient and then obtains the electronic address and any change to the physical address of the intended recipient. Alternatively, the visual cue extraction does not use a full image scan of the envelope, but other reading technology used in such scanners to read incoming mail addresses. If the system has not yet created an image of the mail piece envelope, it does so and sends the image of the envelope to the electronic address of the determined intended recipient with a request for a manual disposition decision. The system then waits for the disposition decision information and records the disposition data. The mail room personnel operating the system then perform the requested action such as discarding and/or destroying the mail piece, opening, extracting and imaging the mail piece for electronic delivery, processing for physical delivery or forwarding to a new recipient and/or location.

In the automated disposition training process, the manual disposition data is recorded and associated with the particular mail piece and its visual cues. The system builds statistical information and can determine for a particular mail piece having a particular set of cues an automated disposition decision to a certain level of confidence. The profiling of the manual disposition decisions with respect to the particular mail pieces utilizes information including the sender information, the recipient name, the method of postal payment, the processing date and other pertinent visual cues. The Intelligent Agent may then be programmed to automatically make disposition decisions over a certain confidence level threshold and to request manual disposition determination assistance if the confidence level is below the threshold. Additionally, the recipient may change the thresholds by class of mail and may modify the preferences for mail pieces received over a period of time or for a particular expected mail piece.

In yet another example, a fourth class of mail pieces is defined as a delayed disposition class. The system places an identifier on the mail piece and sends an image of the envelope to the recipient, but does not wait for a processing instruction. The delayed disposition mail pieces are aggregated for storage. The recipients are notified that they may only request electronic or physical delivery disposition during a delayed disposition window such as four weeks. The delayed disposition requests are processed in batches periodically such as weekly. After the delayed disposition window expires, the mail pieces in that group are destroyed.

In yet a further alternative in the delayed disposition embodiment, the mail piece envelope or outside images are organized by category and periodically aggregated and delivered by category periodically. Accordingly, suspected junk mail may be organized into a group of images and presented weekly for disposition instruction so that the entire group may be processed together to minimize disruption of the recipient's workday. Certain categories of mail such as suspected junk mail are not presented in the received order but rather taken out of order to be considered together in a group.

In yet another embodiment, similar or identical mail pieces may be received addressed to multiple intended recipients at one incoming sorter location or at several related mail sorter locations such as at different facilities of a company. A single person may be selected to review the mail piece for the group and to direct disposition by intended recipient or group. For example, if computer hardware magazines were directed to an intended recipient in a software engineering group, the magazines might be appropriate to send to their destination. However, if intended for a member of the sales force, they might be intercepted. In any case, the system may designate one recipient to receive such a category of mail piece envelope or cover images for manual disposition instructions. The designee may vary in time or by subject matter category of the mail piece. In yet a further alternative embodiment, physical characteristics of the mail piece such as weight are included with the visual cue information to provide a more robust set of mail piece attributes fed into the system for characterization purposes.

Referring to FIG. 1, a schematic diagram of a system 100 for delivering digitized mail according to an illustrative embodiment of the present application is shown. Incoming white mail 110 is delivered to an incoming mail sorter 120. The incoming mail sorter described here is the Olympus II mail sorter available from Pitney Bowes Inc. of Stamford, Conn. However, other incoming mail sorters may be used and in some processes described herein, manual processing may be performed. While the embodiments described refer to mail pieces and envelopes, other packages may be processed and mail items such as magazines that may not include envelopes may be processed. In such cases, exterior image scans are made of the covers or out box material. The incoming mail sorter includes a relatively long transport path 121 and mail pieces may make more than one pass through the system if they are not deposited in an output bin during the first pass through the system.

In this illustrative embodiment, the sorter system 120 includes the traditional physical mail delivery bins that are organized by mail stop code or other designation 124 for delivery by a mail room worker 125. The system 120 also includes new sort bins named the trash bin 126 and the imaging bin 128. If a mail piece is sorted out to on of the physical delivery bins 124, it is processed using physical delivery as in traditional incoming mail processes. If the mail is received at the trash bin 126, it is scheduled for disposal and/or destruction 127. In an alternative, the system still delivers envelope images to intended recipient for all mail pieces automatically designated for destruction. The mail designated for destruction is then saved for a period of time such as 2 months so that any user may override the automated decision within that period of time and provide manual instructions such as to request delivery of the mail piece.

The mail pieces sorted into the imaging bin 128 are then processed by the mail digitizing system. In this illustrative embodiment, the mail extraction and scanning preparation station 130 is a manual processing station. Alternatively, an automated mail opening and extraction system may be used. Then the mail is scanned by scanning station 140. The envelope and contents scan are forwarded to the image storage data repository 150 on path 141. The scanner may be a high speed double sided scanner such as those available from Eastman Kodak Company of Rochester, N.Y. During the first pass through the sorter 120, an image of the envelope of the mail piece is sent to the image storage and processing server along path 122. The image storage and processing server 150 uses the associated electronic delivery address and forwards envelope image data to both the Intelligent Agent 160 on path 151 and the intended recipient 170 on path 153. The second pass through the sorter path 121 results in the physical outsorting of the mail piece into one of the three types of output bins.

After the first pass through 121, the sorter waits for either manual disposition instructions from the user 170 on path 173 or automatically generated disposition instructions from the Intelligent Agent 160 on path 163. Disposition instructions or preferences are also sent from the recipient 170 to the Intelligent Agent 160. Similarly, user feedback relating to automated disposition decisions are provided by the user 170 to the Intelligent Agent 160 on path 161. The disposition data received fro the user and/or the Intelligent Agent is then used to determine the second physical pass sorting into the three categories of sorting bins. The image storage and processing server 150 also facilitates delivery of the scanned contents of the mail pieces to the intended recipient or other modified destination as appropriate on path 153.

Figure 2:
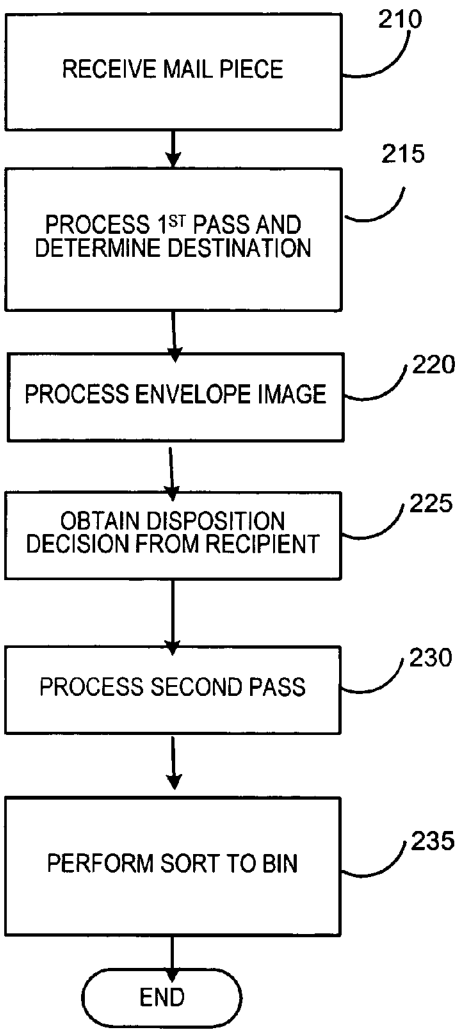
FIG. 2 is a flow chart describing a process for delivering digitized mail using a two pass process according to an illustrative embodiment of the present application.

Referring to FIG. 2, a flow chart describing a process for delivering digitized mail using a two pass process according to an illustrative embodiment of the present application is shown. In step 210, when mail arrives in a mailroom, it is fed into an incoming mail sorter. In the first pass of the incoming mail sorter, an image of the face of the envelope is obtained and a unique identifier is assigned to and applied to the mail piece. In step 215, the sorter performs the incoming mail destination determination. If the incoming mail sorter can make a destination determination, it associates a physical and electronic destination address with the recipient. If the system cannot make the destination determination, it then uses the traditional incoming mail sorting methods to make that determination such as remote operator visual encoding or outsorting for manual processing. For example, an Optical Character Recognition OCR process may be applied to the destination address portion of the envelope to determine the internal physical and electronic address of an intended recipient or a redirected recipient. In step 220, the system sends the envelope image to the Intelligent Agent and extracts and records visual cue information such as the sender's name, address, the method of postage payment and any logo or trade mark of the sender for later processing by the Intelligent Agent system. The Intelligent Agent system may alternatively be incorporated into the Incoming Mail Sorting System.

In step 225, the image of the envelope is electronically transmitted to the determined intended recipient or alternate recipient. The recipient then has the opportunity to review the image of the envelope and make a manual disposition determination for the mail piece. In one embodiment, the mail piece is placed in a hold bin and then the second physical pass through the incoming mail sorter is processed periodically such as every hour to allow the intended recipient time to respond. In an alternative, the mail piece may stay in the incoming mail sorter mail piece loop until a decision is made or until a timeout is reached for the mail piece at which time such mail piece is placed in a hold bin or another out sort bin.

In step 230, the mail piece is fed back into the incoming mail sorter mail piece loop after the manual disposition decision is received from the recipient. The recipient send an electronic notification to the Intelligent Agent System or the Incoming Mail Sorter system including the manual mail piece disposition decision information. In step 235, the Incoming Mail Sorter system performs the sort as indicated by the manual disposition decision information such as sorting to the physical delivery bin, the trash bin or the electronic delivery bin. Accordingly, only the mail pieces that the recipient wants scanned will be processed through the costly opening, extraction and digitization, indexing and electronic delivery processes.

In an alternative, the recipient can include alternate distribution data to the system such that the mail piece is redirected or in the event of an electronic version, copies may be sent to multiple electronic delivery locations. The recipient might also configure a mail forwarding preference such that during a period of time the mail is redirected. For example, a user might set a vacation preference so that electronic mail was redirected to a vacation email, mobile device or facsimile address. Additionally, if a user was expecting a particular piece of mail, the user could setup a predisposition notice using the visual cue information. The recipient could provide the Selective Scanning System with the sender name and approximate date of delivery with a pre-disposition decision such as to send the mail piece physically to the recipient.

The Selective Scanning System also maintains an audit trail for each mail piece as it is being processed so that any exceptions may be flagged for handling. The firs scan of the envelope image is matched up with a subsequent disposition determination including physical delivery, electronic scan and delivery or trash disposal.

Figure 3:
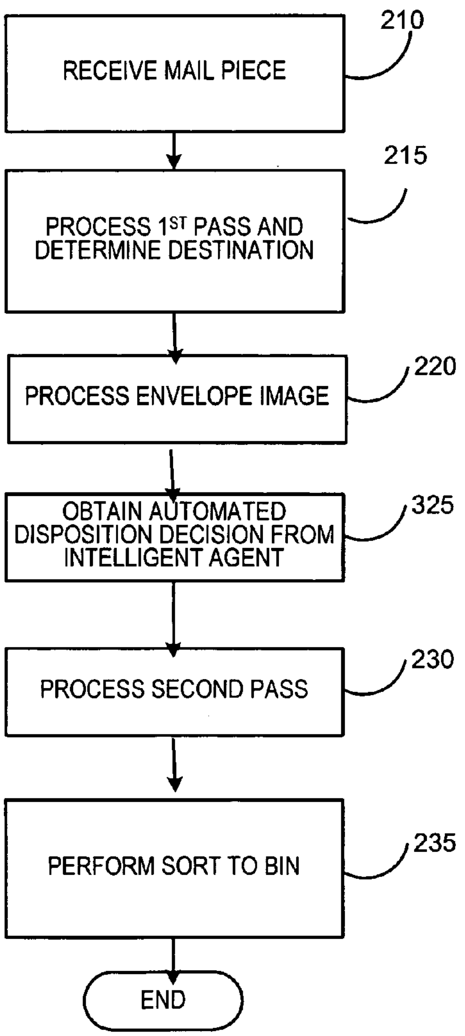
FIG. 3 is a flow chart describing a process for delivering digitized mail using an automated disposition decision process according to an illustrative embodiment of the present application.

Referring to FIG. 3, a flow chart describing a process for delivering digitized mail using an automated disposition decision process according to an illustrative embodiment of the present application is shown. Here, the step 325 is provided in place of step 225 to allow for an automated disposition decision. As can be appreciated, the manual disposition process may still be used under certain conditions. The Selective Scanning System employs an Intelligent Agent that learns to create automated mail piece disposition decisions based upon the visual cues captured and learned disposition history of a user or group of users and within a set of operating parameters. Accordingly, the user would not have to make a manual disposition decision for each mail piece and therefore the user would save time. As described below, the Intelligent Agent system operates on behalf of the recipient as a proxy to fulfill the recipient's agenda and follow his interests in providing autonomous, personalized and high quality decision services. As discussed above, the recipient provides decision parameters and provides feedback regarding the system. If the recipient indicates an incorrect decision for a mail piece received, the system updates its records and factors the overriding manual decision into the future statistical analysis. Of course, of the recipient never receives a piece of mail do to an automated decision, it would be difficult to provide feedback to the system. Accordingly, in an alternative, the Selective Scanning System batches envelope images of mail pieces that the Intelligent Agent decides to dispose of in the trash. The Selective Scanning System is then operated to hold those mail pieces until the user has an opportunity to review the batch of envelope images in order to decide if the recipient needs to override the trash decisions.

As described herein, the Intelligent Agent system obtains information regarding recipient disposition decisions as stored in a user profile database including the feedback disposition data, the associated mail piece attribute data and the preference data. The knowledge of recipient disposition decisions and usage related to a plurality of mail pieces is accumulated over time and a confidence level of different disposition decisions for different mail pieces are calculated. If the recipient detects poor decisions being made by the Intelligent Agent, the recipient may elect to modify the decision confidence level parameter or to adjust the importance parameters associated with particular attributes such as visual cues. If the Intelligent Agent encounters an unknown mail piece or does not have a sufficient level of confidence in the disposition decision suggestions, then the two step process described with reference to FIG. 2 is applied in order to obtain a manual disposition decision from the recipient.

Figure 4:
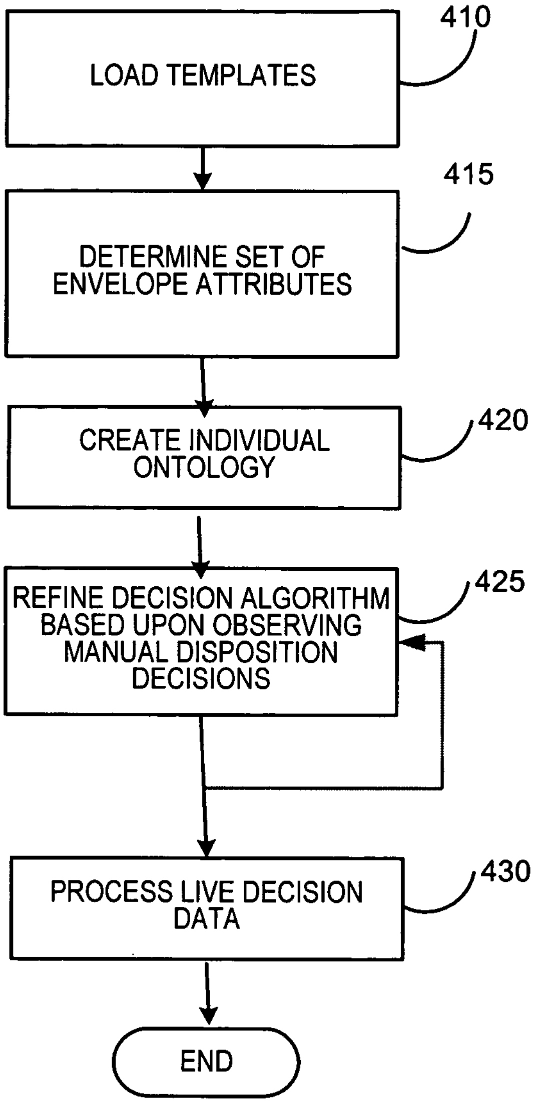
FIG. 4 is a flow chart describing a process for determining user digitized mail receipt preferences for use in making an automated disposition decision according to an illustrative embodiment of the present application.

Referring to FIG. 4, a flow chart describing a process for determining user digitized mail receipt preferences for use in making an automated disposition decision according to an illustrative embodiment of the present application is shown. In using an Intelligent Agent computer system to provide disposition instructions or suggestions, such a system is not a discrete event rules processor, but rather an adaptive, "long life" software entity that tends to be proactive, goal-oriented, adaptive and communicative. It is designed to proactively work to improve its decision making given a set of goals, in this case is to improve the user's satisfaction on auto-classify and disposed mail pieces.

In an Intelligent Agent System, User Preferences are not simply defined as a database management lookup problem because there are too many input variable and possible combinations to create a lookup table of responses. A yes or no disposition is not simply a database entry but rather a statistical analysis of historical data across a period of history for a user or a group of users to provide a confidence ranking in a proposed automated decision. In a simple database lookup system, the user would be burdened with pre-classifying every possible combination of decision data points. To implement the intelligent agent to make adaptive decision on behave of the mail receiver, this embodiment starts with modeling the important attributes of a mail piece that are most interesting to the recipient. The system begins with an initial template selected based upon the type of recipient in question and prior history from the company in question or other companies. The particular recipient will then teach the system by entering predefined preferences and by having the system learn additional recipient preferences. This generalization of the visual cue attributes of mail are used to classify future mail. That ontology can be used is to create a customized ontology for each user so that the disposition decision is not based on a generic keyword matching on those attributes. Rather, the disposition decision may be inferred in real time based on the developed ontologies. Furthermore, a probabilistic model is applied to provide a computation model used to threshold and adjust the decision parameters dynamically.

The initial step 410 is to load a set of templates into the Intelligent Agent for a newly installed mailroom site. In this illustrative embodiment, an Ethnography study is performed to determine what attribute of mail matter most to a particular user and then to related groups of uses at the site. In an alternative, the set of templates is selected from stock templates based upon similarity to previous target implementations. In step 415, the system generalizes the attributes into a standard set of attributes such as the visual cues typically available and any other more robust set of attributes available in a particular implementation. In step 420, the system creates an ontology tailored for each individual user using an Ontology editor such as the Protégé ontology editor available from Stanford University of Stanford, Calif. The system then identifies related concepts surrounding those attributes. In step 425, an iterative process is applied to adjust the recipient preferences based upon usage history. In this illustrative embodiment, the automated disposition decision suggestion is based on the template as modified by the disposition of previous cases by that recipient. A Baysian network is employed to compute the probability of certain disposition of mail pieces using the attributes generated and the disposition data received in the learning process. Alternatively, a case based reasoning approach may be applied as an alternative learning tool to modify the recipient preferences. Furthermore, rule based inference tools such as Jena available from Hewlett-Packard Company of Palo Alto, Calif. or the Jess and Drools open source tools. Similarly, the commercially available rule based inference systems available from ILOG software of Mountain View, Calif. and systems from the Fair Isaac Corporation of Minneapolis, Minn. can be used to infer disposition decisions. Other decisions mechanisms such as a decision tree, neural network, k-nearest neighbor or other suitable machine learning algorithm may be used.

In step 430, the Intelligent Agent system is available to receive new mail piece attributes and to develop a disposition decision to a certain confidence level that is acted upon if the confidence level is above the particular confidence level being applied. An illustrative sample portion of an illustrative user profile maintained by the Intelligent Agent is shown in TABLE 1.

TABLE 1

| Sender Name | Sender Address | Keywords | Portal Methods | 3 Mo. history | Preferred Disposition | Alternate Disposition | Confidence |
|---|---|---|---|---|---|---|---|
| Bank | 109 York, VN 09999 | Bank statement, finance | Pre-sort | 5 | Physical delivery to office | Image and email to email1 | 70% |
| Telco | PO BOX 555, CA 96027 | Cell, phone, mobile | 1st Class | 2 | Physical delivery to residence | Image and email to email2 | 60% |
| Bank2 | 3090 Board St., NY 00001 | Credit card | 1st Class | 0 | Discard | Discard | 80% |

In the illustrative embodiment described here, the Selective Scanning system utilizes a Bayesian network algorithm. Alternatively other decision algorithms may be used. In the illustrative scenario described, a set of key variables listed in the table below are used to affect the outcome of the mail disposition decision. The variables form a directed acyclic graph indicating the dependency of the variables to the final outcome. Three stages of the learning process are described. First, the system employs a training dataset accumulations stage. Next the system applies an iterative learning and adjustment stage and finally, the system employs a continued learning feedback and stabilization stage in a live or parallel beta test stage. During the beta test stage, the dispositions may be made automatically, but also manually check for accuracy with such feedback provided to the system.

During the training dataset acquisition stage, the Intelligent Agent system records the event occurrence given attribute variable values and disposition outcomes. The attribute data can be collected during the first pass sorting stage and may be augmented when the user provides a manual disposition decision. Accordingly, the Intelligent Agent computes the probability of events for each attribute variable value accumulatively. After the Intelligent Agent finishes the training data and accumulation stage, it can then compute the probability of the outcome of a given new set of attribute variable values with a certain level of confidence. If a particular confidence level in a decision is reached, the Intelligent Agent will be allowed to make a disposition decision automatically on behalf of the recipient. The confidence threshold may be set independently for each disposition such that the extreme disposition of trash disposal must be made only when the confidence level is 95% or above.

When an Intelligent Agent instantiation is first running at a particular site, the Agent may not have a robust set of historical data. Accordingly, the Agent may make overconfident decisions and may make mistakes in categorizing and assigning disposition decisions for particular mail pieces. Accordingly, the recipients will provide feedback regarding mistaken decisions. Thus a supervised learning mechanism is employed to reinforce the quality of learning. If a mail piece is incorrectly classified by the Agent, the user provides feedback regarding the appropriate classification. The mail piece is then reprocessed and the Agent adjusts the profile for the recipient accordingly. After an initial stage, the system will stabilize and most of the decisions should be consistent with the wishes of the recipient.

Furthermore, the automated disposition decision is dynamically linked with recipient status information and schedule information. For example, if a user is planning a vacation, mail pieces may be redirected to another person during that period or even to multiple different people depending upon the type of mail piece received. For example, mail from a bank would be redirected to a first alternate recipient and all other mail routed to a second alternate recipient. Furthermore, a type of decision could be suspended during that time such as a configuration allowing no mail to be discarded in that period.

Finally, the profile variables and weighting associated with each attribute variable may change over time with new variable added, some deleted and others changed. The system would then apply a new round of iterative learning after such adjustments are made.

In an alternative learning method, the study utilizes technology to monitor whether a user opened a mail piece that was physically delivered and tracks the mail piece to determine if it was discarded. The system also tracks whether the mail piece was discarded before opening or after opening and how long after physical receipt it was discarded. Systems and methods described in commonly-owned, co-pending patent application Ser. No. 10/735,933, filed Dec. 15, 2003 by Stemmle, et al., entitled "System And Method For Determining And Reporting Whether A Mail Piece Has Been Opened By A Recipient", now U.S. Pat. No. 7,156,290, may be advantageously utilized herein and the application is incorporated herein by reference in its entirety. The systems and methods described there may be used to assist in the mail piece disposition learning process. If the user does not open a particular mail piece and discards it, that historical disposition data is entered into the Intelligent Agent system.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. In addition, the concepts of the present invention are not limited to application in the area of mail piece processing, but may also be used in connection with other devices benefiting from learned automated delivery disposition decisions. Accordingly, the invention is not to be considered as limited by the foregoing description.

We claim:

1. A method for processing incoming mail in accordance with recipient disposition preferences using an incoming mail sorter comprising:
receiving a mail piece having an envelope and mail piece contents at the incoming mail sorter;
scanning an image of the envelope on the incoming mail sorter;
determining an intended recipient of the mail piece;
processing the envelope image in order to obtain a disposition decision including whether or not to scan the mail piece contents, wherein the disposition decision is received from an Intelligent Agent system that uses the processed envelope image and that learns from prior disposition decisions in order to determine recipient disposition preferences;
obtaining the disposition decision regarding the mail piece as a result of processing the envelope image;
processing the mail piece on the incoming mail sorter in accordance with the disposition decision; and;
receiving disposition decision feedback information from the recipient and updating the Intelligent Agent based upon the feedback.

2. The method of claim 1, wherein:
the possible disposition decisions include discard the mail piece in the trash, physically deliver the mail piece and electronically deliver the mail piece.

3. The method of claim 1, wherein:
the possible disposition decisions include redirecting the physical mail piece physically to a new location or a new recipient without scanning the mail piece contents.

4. The method of claim 1, wherein:
the possible disposition decisions include a broadcast electronic delivery of the mail piece contents to at least two recipients.

5. The method of claim 1, wherein:
the disposition decision depends on the schedule of the intended recipient.

6. The method of claim 1, wherein:
the disposition decision depends on a pre-determined disposition for an expected mail piece.

7. The method of claim 1, further comprising:
assigning a unique code to the mail piece, wherein:
the unique code is unique to a particular company location during a particular period of time.

8. The method of claim 1, further comprising:
storing the mail piece in the incoming mail sorter pending receipt of the disposition decision, but not longer than the expiration of a delayed disposition period.

9. A method for automatically processing incoming mail disposition decisions in accordance with recipient disposition preferences using an incoming mail sorter and an intelligent agent computer system, the intelligent agent computer system configured to include a mail piece disposition ontology with a set of mail piece attributes including visual cues based upon an ethnography study, the method comprising:
receiving, at the intelligent agent computer stem, from a recipient mail piece disposition data including manual incoming mail dispositions associated with particular mail pieces having particular attributes;
refining an automated decision algorithm, for the recipient, in the intelligent agent system using the received mail piece disposition data; and
applying the automated decision algorithm, for the recipient, to suggest automated disposition decisions to the incoming mail sorter including whether or not to scan contents of the mail piece contents and a corresponding disposition decision confidence level based upon mail piece envelope attribute data.

10. The method of claim 9, further comprising:
receiving disposition decision accuracy feedback from the recipient.

11. The method of claim 10, further comprising:
modifying the automated decision algorithm based upon the decision accuracy feedback from the recipient.

12. The method of claim 9, wherein:
the automated decision algorithm includes a Bayesian network.

13. The method of claim 9, wherein:
receiving the mail piece disposition decision data includes utilizing a system for determining if an intended recipient opened a mail piece.

* * * * *